(12) United States Patent
Ng et al.

(10) Patent No.: US 11,002,530 B2
(45) Date of Patent: May 11, 2021

(54) TILTABLE PLATFORM FOR ADDITIVE MANUFACTURING OF A POLISHING PAD

(71) Applicant: Applied Materials, Inc., Santa Clara, CA (US)

(72) Inventors: Hou T. Ng, Campbell, CA (US); Nag B. Patibandla, Pleasanton, CA (US); Sivapackia Ganapathiappan, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 212 days.

(21) Appl. No.: 15/494,302

(22) Filed: Apr. 21, 2017

(65) Prior Publication Data

US 2018/0079152 A1 Mar. 22, 2018

Related U.S. Application Data

(60) Provisional application No. 62/397,223, filed on Sep. 20, 2016.

(51) Int. Cl.
*B29C 64/227* (2017.01)
*G01B 11/06* (2006.01)
(Continued)

(52) U.S. Cl.
CPC ........ *G01B 11/0608* (2013.01); *B24D 18/009* (2013.01); *B29C 64/112* (2017.08);
(Continued)

(58) Field of Classification Search
CPC ......... B33Y 10/00; B33Y 30/00; B33Y 40/00; B33Y 50/00; B33Y 50/02; B29C 64/20;
(Continued)

(56) References Cited

U.S. PATENT DOCUMENTS 5,257,478 A 11/1993 Hyde et al.
5,387,380 A 2/1995 Cima et al.
(Continued)

FOREIGN PATENT DOCUMENTS

CN 103802318 5/2014
CN 103802322 5/2014
(Continued)

OTHER PUBLICATIONS

U.S. Appl. No. 15/494,333, Ng et al., filed Apr. 21, 2017.
(Continued)

*Primary Examiner* — Timothy Kennedy
*Assistant Examiner* — Alexander A Wang
(74) *Attorney, Agent, or Firm* — Fish & Richardson P.C.

(57) ABSTRACT

An additive manufacturing apparatus for forming a polishing pad for chemical mechanical polishing includes a platform, an actuator system coupled to the platform to adjust a tilt of the platform, one or more printheads supported above the platform, the one or more printheads configured to dispense successive layers of feed material on the platform to be form the polishing pad, a sensing system to detect a height of a surface on or above the platform at each of a plurality of horizontally spaced points, and a controller configured to selectively operate the actuator system to adjust the tilt of the platform based on the detected height of the platform at each of the points such that the surface is moved closer to horizontal.

14 Claims, 8 Drawing Sheets

(51) Int. Cl.
| | |
|---|---|
| *B33Y 10/00* | (2015.01) |
| *B33Y 30/00* | (2015.01) |
| *B24D 18/00* | (2006.01) |
| *B29C 64/112* | (2017.01) |
| *B29C 64/277* | (2017.01) |
| *B29C 64/245* | (2017.01) |
| *B29C 64/236* | (2017.01) |
| *B29C 64/209* | (2017.01) |
| *B33Y 80/00* | (2015.01) |
| *B29C 64/129* | (2017.01) |
| *B29C 64/386* | (2017.01) |
| *B29L 31/00* | (2006.01) |
| *B24B 37/24* | (2012.01) |
| *B24B 37/26* | (2012.01) |
| *B24B 37/20* | (2012.01) |
| *B33Y 40/00* | (2020.01) |
| *G01N 15/10* | (2006.01) |
| *G01N 15/14* | (2006.01) |

(52) U.S. Cl.
CPC .......... *B29C 64/129* (2017.08); *B29C 64/209* (2017.08); *B29C 64/227* (2017.08); *B29C 64/236* (2017.08); *B29C 64/245* (2017.08); *B29C 64/277* (2017.08); *B29C 64/386* (2017.08); *B33Y 10/00* (2014.12); *B33Y 30/00* (2014.12); *B33Y 80/00* (2014.12); *B24B 37/20* (2013.01); *B24B 37/245* (2013.01); *B24B 37/26* (2013.01); *B29L 2031/736* (2013.01); *B33Y 40/00* (2014.12); *G01N 2015/1075* (2013.01); *G01N 2015/1493* (2013.01)

(58) Field of Classification Search
CPC ... B29C 64/386; B29C 64/393; B29C 64/209; B29C 64/236; B29C 64/227; B29C 64/245
See application file for complete search history.

(56) References Cited

U.S. PATENT DOCUMENTS

| | | | |
|---|---|---|---|
| 5,738,574 | A | 4/1998 | Tolles et al. |
| 5,900,164 | A | 5/1999 | Budinger et al. |
| 5,906,863 | A | 5/1999 | Lombardi et al. |
| 5,921,855 | A | 7/1999 | Osterheld et al. |
| 5,932,290 | A | 8/1999 | Lombardi et al. |
| 5,940,674 | A | 8/1999 | Sachs et al. |
| 6,423,255 | B1 | 7/2002 | Hoechsmann et al. |
| 6,875,097 | B2 | 4/2005 | Grundwald |
| 7,531,117 | B2 * | 5/2009 | Ederer et al. |
| 9,067,299 | B2 * | 6/2015 | Bajaj ..................... B29C 64/112 |
| 9,457,520 | B2 | 10/2016 | Bajaj |
| 2001/0020448 | A1 | 9/2001 | Vaartstra et al. |
| 2001/0046834 | A1 | 11/2001 | Ramana et al. |
| 2002/0111707 | A1 | 8/2002 | Li |
| 2004/0154533 | A1 | 8/2004 | Agarwal et al. |
| 2005/0012247 | A1 | 1/2005 | Kramer |
| 2005/0049739 | A1 | 3/2005 | Kramer |
| 2005/0110853 | A1 | 5/2005 | Gardner et al. |
| 2005/0278056 | A1 | 12/2005 | Farnworth |
| 2006/0019587 | A1 | 1/2006 | Deopura et al. |
| 2006/0099287 | A1 | 5/2006 | Kim |
| 2006/0111807 | A1 | 5/2006 | Gothait |
| 2006/0192315 | A1 | 8/2006 | Farr et al. |
| 2007/0128991 | A1 | 6/2007 | Yoon et al. |
| 2007/0212979 | A1 | 9/2007 | Preston |
| 2007/0235904 | A1 | 10/2007 | Saikin |
| 2008/0157436 | A1 | 7/2008 | Patel et al. |
| 2009/0321979 | A1 | 12/2009 | Hiraide |
| 2010/0191360 | A1 | 7/2010 | Napadensky |
| 2010/0323050 | A1 | 12/2010 | Kumagai et al. |
| 2011/0059247 | A1 | 3/2011 | Kuzusako et al. |
| 2012/0105534 | A1 | 5/2012 | Boday et al. |
| 2013/0283700 | A1 | 10/2013 | Bajaj et al. |
| 2015/0217519 | A1 * | 8/2015 | Otten .................... B29C 64/386 264/40.1 |
| 2015/0352839 | A1 * | 12/2015 | Folkins ................. B33Y 50/02 347/14 |
| 2016/0067740 | A1 * | 3/2016 | Voris ..................... B33Y 10/00 427/402 |
| 2016/0214323 | A1 * | 7/2016 | Mizes ................... B29C 64/393 |
| 2017/0036404 | A1 | 2/2017 | Rengers et al. |
| 2017/0072463 | A1 * | 3/2017 | Ng .......................... B33Y 30/00 |
| 2020/0229905 | A1 * | 7/2020 | Uckelmann ........... B29C 64/245 |

FOREIGN PATENT DOCUMENTS

| | | |
|---|---|---|
| CN | 203937195 | 11/2014 |
| CN | 204018721 | 12/2014 |
| DE | 19834559 | 2/2000 |
| EP | 1512519 | 3/2005 |
| EP | 1661690 | 5/2006 |
| EP | 2277686 | 1/2011 |
| EP | 2431157 | 3/2012 |
| JP | 2002-28849 | 1/2002 |
| JP | 2006-95680 | 4/2006 |
| JP | 2008-531306 | 8/2008 |
| KR | 10-2005-0052876 | 6/2005 |
| KR | 10-2008-0038607 | 5/2008 |
| TW | 201234466 | 8/2012 |
| WO | WO 01/64396 | 9/2001 |
| WO | WO 02/24415 | 3/2002 |
| WO | WO 2013/128452 | 9/2013 |

OTHER PUBLICATIONS

U.S. Appl. No. 15/494,332, Ng et al., filed Apr. 21, 2017.
'Wikipedia' [online]. "3D printing," 2013, [retrieved on Feb. 25, 2013]. Retrieved from the Internet: URL:http://en.wikipedia.org/wiki/3D_printing 17 pages.
Cook, "CMP Consumables II: Pad," Semiconductors and Semimetals, 2000, 155-181.
Desai et al., "Effect of Polishing Pad Material Properties on Chemical Mechanical Polishing (CMP) Processes," Center for Polymer Research, University of Texas, Austin, TX 78712, 1994, 8 pages.
Jun et al., "Slicing Bitmap Generation and Patterning technique a SFF System Using UV-resin," International Conference on Control, Automation and Systems (2007).
Krober et al., "Reactive inkjet printing of polyurethanes," Journal of Materials Chemistry 19:5234-5238 (2009).
Rodel, Rodel IC1000 CMP Pad, 1999, 2 pages.
Van den Berg et al., "Inkjet printing of polyurethane colloidal suspensions," Soft Matter 3:238-243 (2007).
Yang et al., "High Viscosity Jetting System for 3D Reactive Inkjet Printing," Twenty Forth Annual International Solid Freeform Fabrication Symposium (2013), pp. 505-513.

* cited by examiner

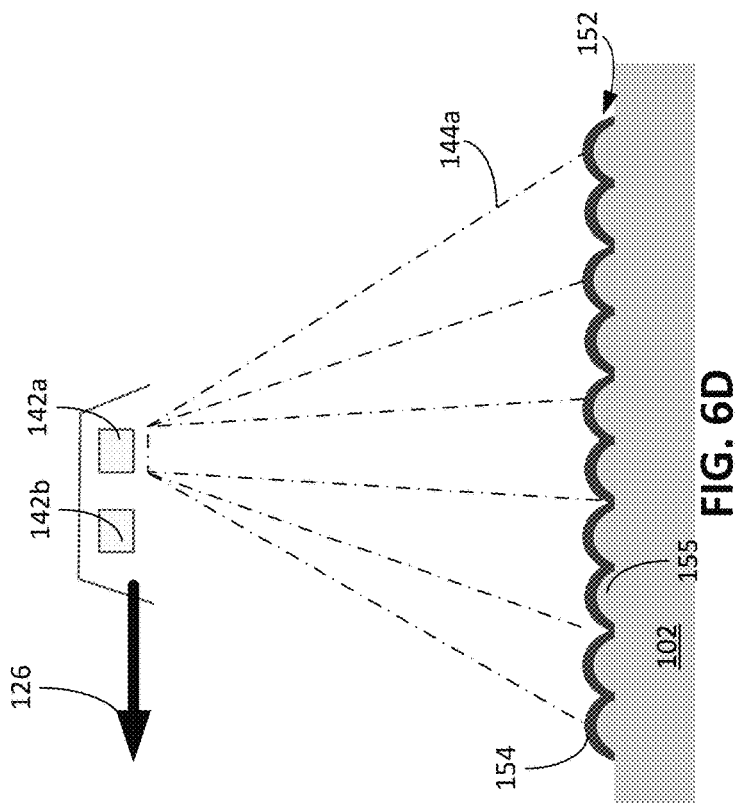
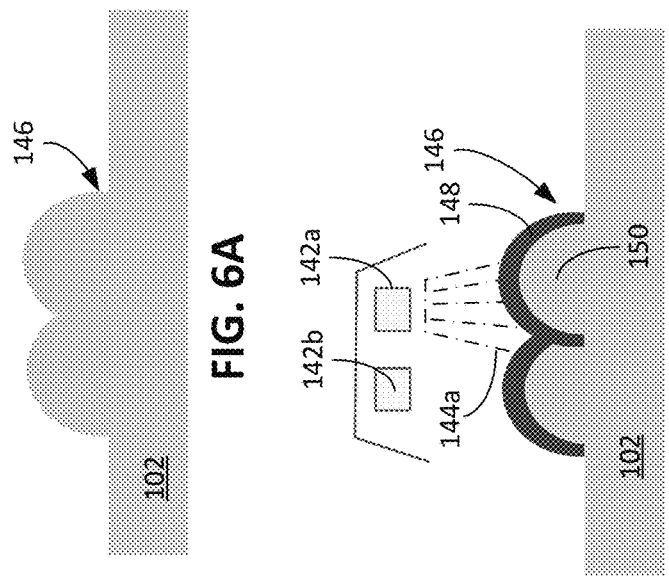
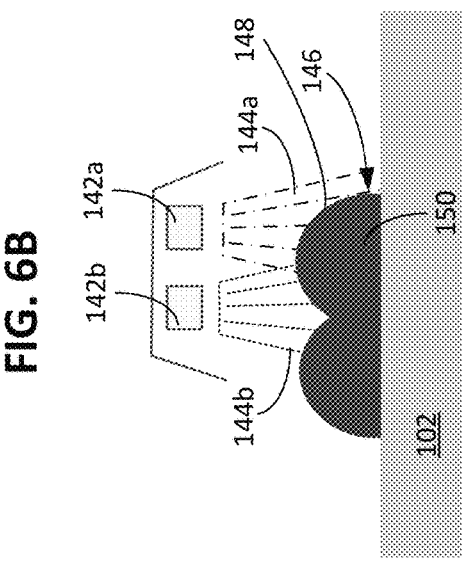

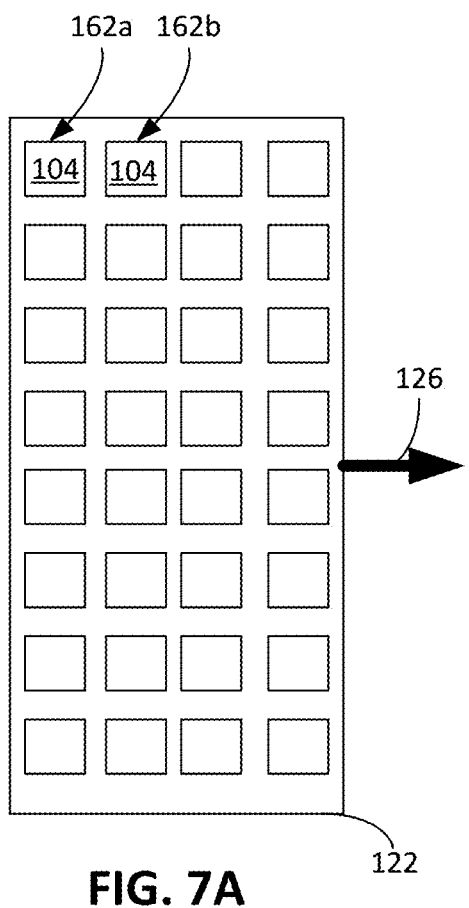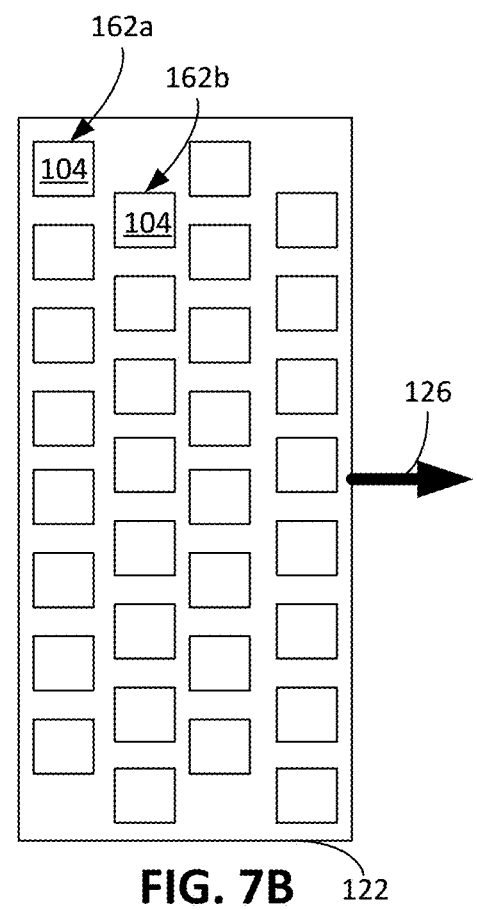
FIG. 7A
FIG. 7B

TILTABLE PLATFORM FOR ADDITIVE MANUFACTURING OF A POLISHING PAD

CROSS-REFERENCE TO RELATED APPLICATIONS

This application claims priority to U.S. application Ser. No. 62/397,223, filed on Sep. 20, 2016, the entire disclosure of which is incorporated by reference.

TECHNICAL FIELD

This specification relates to control of dispensing operations for additive manufacturing apparatuses, particularly, to control of dispensing operations of feed material for forming a polishing pad.

BACKGROUND

An integrated circuit is typically formed on a substrate by the sequential deposition of conductive, semiconductive, or insulative layers on a silicon wafer. A variety of fabrication processes require planarization of a layer on the substrate. For certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad.

One objective of a chemical mechanical polishing process is polishing uniformity. If different areas on the substrate are polished at different rates, then it is possible for some areas of the substrate to have too much material removed ("overpolishing") or too little material removed ("underpolishing"). In addition to planarization, polishing pads can be used for finishing operations such as buffing.

Some polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer.

Polishing pads are typically made by molding, casting or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

SUMMARY

In one aspect, an additive manufacturing apparatus includes a platform, an actuator system coupled to the platform to adjust a tilt of the platform, one or more printheads supported above the platform, the one or more printheads configured to dispense successive layers of feed material on the platform, the layers of feed material to be formed into a polishing pad, a sensing system to detect a height of a surface on or above the platform at each of a plurality of horizontally spaced points, and a controller configured to selectively operate the actuator system to adjust the tilt of the platform based on the detected height of the platform at each of the points such that the surface is moved closer to horizontal.

In another aspect, a method of additive manufacturing includes detecting a height of a surface on or above a platform at each of a plurality of horizontally spaced points, adjusting a tilt of the platform based on the detected height of the surface at each of the points such that the surface on the platform is moved closer to horizontal, and successively dispensing a plurality of layers of feed material on the platform from one or more printheads, the layers of feed material to be formed into a polishing pad.

Implementations of either aspect may include one or more of the following features.

The surface may correspond to a top surface of the layers of feed material. The sensing system may be configured to detect a height of the top surface of the layers of feed material on the platform at each of the points, and the controller may be configured to selectively operate the actuator system to adjust the tilt of the platform based on the detected height of the top surface of the layers of feed material at each of the points.

The surface may corresponds to a top surface of the platform. The controller may be configured to selectively operate the actuator system before the one or more printheads dispense the layers of feed material.

A support may be arranged above the platform, the one or more printheads may be mounted to the support above the platform, and an actuator may be coupled to the support. The controller may be configured to selectively operate the actuator to vertically move the support based on the detected height of the surface at each of the points. The sensing system may be mounted on the support. The support may be configured to scan across the platform along a first axis. The one or more printheads may be configured to extend across a width of a build area of the platform along a second axis perpendicular to the first axis.

The sensing system may include a non-contact sensor, e.g., an optical sensor, to detect the height of the surface at each of the points. The controller may be configured to determine a height skew based on the height of the surface at each of the points, and selectively operate the actuator system to pivot the platform so as to reduce the height skew. The controller may be configured to operate the actuators to lower the platform after each of the layers of feed material is deposited so as to maintain a constant height offset between the one or more printheads and an exposed layer of the layers of the feed material from layer-to-layer.

At least some of the points may be positioned proximate to where a perimeter of the polishing pad is to be formed. The at least some of the points may be positioned at equal angular intervals around a vertical axis through a center of where the polishing pad is to be formed. There may be four points positioned at equal angular intervals around the vertical axis. At least one of the points may be positioned along a vertical axis through a center of where the polishing pad is to be formed.

The actuator system may include a plurality of vertical actuators positioned at different angular positions around a center of the platform. The platform may be is pivotally coupled to the each of the three vertical actuators. The actuator system may have three vertical actuators.

The controller may be configured to adjust a dispensing operation of a second printhead in response to detecting an error condition associated with the first printhead while operating the printheads to successively dispense the layers of feed material. An optical sensor may monitor characteristics of a drop of feed material dispensed by a printhead, the characteristics selected from the group consisting of a velocity, a trajectory, or a size of the drop. An optical sensor may detect an error condition for a nozzle of a printhead through which the feed material is dispensed, the error condition selected from the group consisting of a clog of feed material and pooling of feed material in the nozzle.

In another aspect, an additive manufacturing apparatus includes a platform, a plurality of printheads supported above the platform and configured to dispense successive layers of feed material on a top surface of the platform, the layers of feed material to be formed into a polishing pad, an optical sensor to monitor a dispensing operation of a first printhead of the plurality of printheads, and a controller configured to detect an error condition associated with the first printhead based on monitoring the dispensing operation of the first printhead while operating the printheads to successively dispense the layers of feed material, and adjust a dispensing operation of a second printhead of the plurality of printheads in response to detecting the error condition.

In another aspect, a method of additive manufacture includes monitoring a dispensing operation of a first printhead of a plurality of printheads while operating the plurality of printheads to successively dispense the layers of feed material to form a polishing pad, and adjusting a dispensing operation of a second of the printheads in response to detecting an error condition associated with the dispensing operation of the first of the printheads.

Implementations of either aspect may include one or more of the following features.

The controller may be configured to adjust the dispensing operation of the second printhead by increasing a rate at which the feed material is delivered from the second printhead. The controller may be configured to detect the error condition by determining that a parameter of a feature of the layers of feed material is outside of the predefined range. The controller may be configured to detect the error condition by detecting a surface free energy modification on the layers of feed material. The error condition may correspond to at least one of a nozzle clog, nozzle plate puddling, a drop velocity outside of a predefined range, a drop trajectory outside of a predefined range, or a drop uniformity outside of a predefined range. The controller may be configured to operate the optical sensor to monitor a nozzle of the first of the printheads. The controller may be configured to operate the printheads to dispense a test pattern of feed material positioned outside of a portion of the layers of feed material to be formed into the polishing pad, and operate the optical sensor to monitor a feature of a test pattern of feed material dispensed by the printheads. The second printhead may be adjacent to the first printhead along a direction of scanning of the plurality of printheads.

In another aspect, an additive manufacturing apparatus includes a platform, a support configured to scan across the platform, one or more printheads mounted on the support above the platform and configured to dispense successive layers of feed material to form a polishing pad, first and second energy sources mounted on the support above the platform to emit first and second radiation beams, respectively, toward the successive layers of feed material on the platform, and a controller configured to operate the printheads to dispense a drop of feed material on the platform, operate the first energy source to emit the first radiation beam toward the drop of feed material to cure an exterior surface of the drop of feed material, and operate the second energy source to emit the second radiation beam toward the drop of feed material to cure an interior volume of the drop of feed material.

In another aspect, a method of additive manufacturing includes dispensing successive layers of feed material to form a polishing pad, and directing first and second radiation beams toward the layers of feed material to form a polishing pad. Dispensing the layers of feed material includes dispensing a drop of feed material, and directing the first and second radiation beams toward the layers of feed material includes directing the first radiation beam toward the drop of feed material to cure an exterior surface of the drop of feed material, and directing the second radiation beam toward the drop of feed material to cure an interior volume of the drop of feed material.

Implementations of either aspect may include one or more of the following features.

The first radiation beam may have a wavelength less than a wavelength of the second radiation beam. The first and second energy sources may be positioned and the controller may be configured to operate the first and second energy sources such that the drop of feed material is simultaneously exposed to the first and second radiation beams. The first and second energy sources may be positioned and the controller may be configured to operate the first and second energy sources such that the exterior surface of the drop of feed material is cured before the interior volume of the drop of feed material is cured. The first energy source may be positioned before the second energy sources along a direction that the support scans across the platform. The controller may be configured to dispense successive lines of feed material to form a layer of feed material while operating the first energy source to successively cure exterior surfaces of the lines of feed material, and while operating the second energy source to successively cure interior volumes of the lines of feed material.

The controller may be configured to operate the first energy source to cure the exterior surface of the drop of feed material such that a diameter of the drop of feed material is within a desired range. The first energy source may include a first bank of energy emitters to emit the first radiation beam, and the second energy source may include a second bank of energy emitters to emit the second radiation beam. The first and second banks may extend along a horizontal direction perpendicular to a direction of motion of the support. The first and second energy sources may be configured such that the first and second radiation beams expose an elongate portion of the layers of feed material, the elongate portion extending along a direction perpendicular to a direction of motion of the support.

Advantages of the foregoing may include, but are not limited to, the following.

Adjusting the tilt of the platform in response to the detected heights can ensure that the dispensed feed material remains where it was originally deposited. This can improve fidelity of the printed article to the desired shape, and/or improve layer-by-layer thickness tolerances and/or improve flatness for each layer.

The sensing system can also facilitate selective control of printheads to avoid operation of printheads having error conditions. By only operating the properly functioning printheads to dispense feed material, the controller can improve tolerances of features of the article. Furthermore, by using signals from the sensing system, the controller can perform printing operations without stopping due to error conditions associated with some of the printheads. When the printheads experience error conditions, the controller can avoid stopping the printing operations by operating other printheads not experiencing error conditions to compensate for the printheads having the error conditions.

In some cases, when the additive manufacturing apparatus includes multiple energy sources, the multiple energy sources can improve throughput by selectively curing portions of the dispensed feed material. For example, by selectively curing the exterior surface of the dispensed feed material, one of the energy sources can stabilize the feed material so that the dispensing operation can continue as the feed material continues to be cured. In some cases, the energy sources can also improve throughput because one of the energy sources can emit radiation that cures the interior volume of the feed material in bulk.

In some cases, the additive manufacturing apparatus includes multiple printheads that dispense multiple feed materials to allow an article, e.g., a polishing pad, having multiple layers of distinct material characteristics to be easily formed. The controller can control the delivery of feed material to the printheads so that a user does not have to switch out feed material during a printing operation. Furthermore, the controller can operate a feed material delivery system so that each printhead can deliver feed material from any one of the feed material sources available in the feed material delivery system. Such a configuration can improve adaptability of the additive manufacturing system and enable selective dispensing of different types of feed material to form a part.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 6A, 6B, and 6C depict curing operations of drops of feed material.
FIG. 6D depicts a curing operation of a line of feed material.
FIGS. 7A and 7B are bottom cross-sectional views of a printhead module.

Like reference numbers and designations in the various drawings indicate like elements.

DETAILED DESCRIPTION

An additive manufacturing apparatus can dispense feed materials to form an article, e.g., a polishing pad, having tight tolerances, e.g., good thickness uniformity. Multiple types of feed materials can be used to form a single layer of feed material. The article can include multiple layers each having distinct material properties. Multiple printheads can be used to dispense different feed materials. The apparatus can include multiple energy sources that cure different portions of the dispensed feed material. The apparatus can also include a material delivery system to deliver the various feed materials to the printheads. Such examples of additive manufacturing apparatus, methods, and systems described herein can improve throughput of fabrication of polishing pads having tight tolerances.

Figure 1:
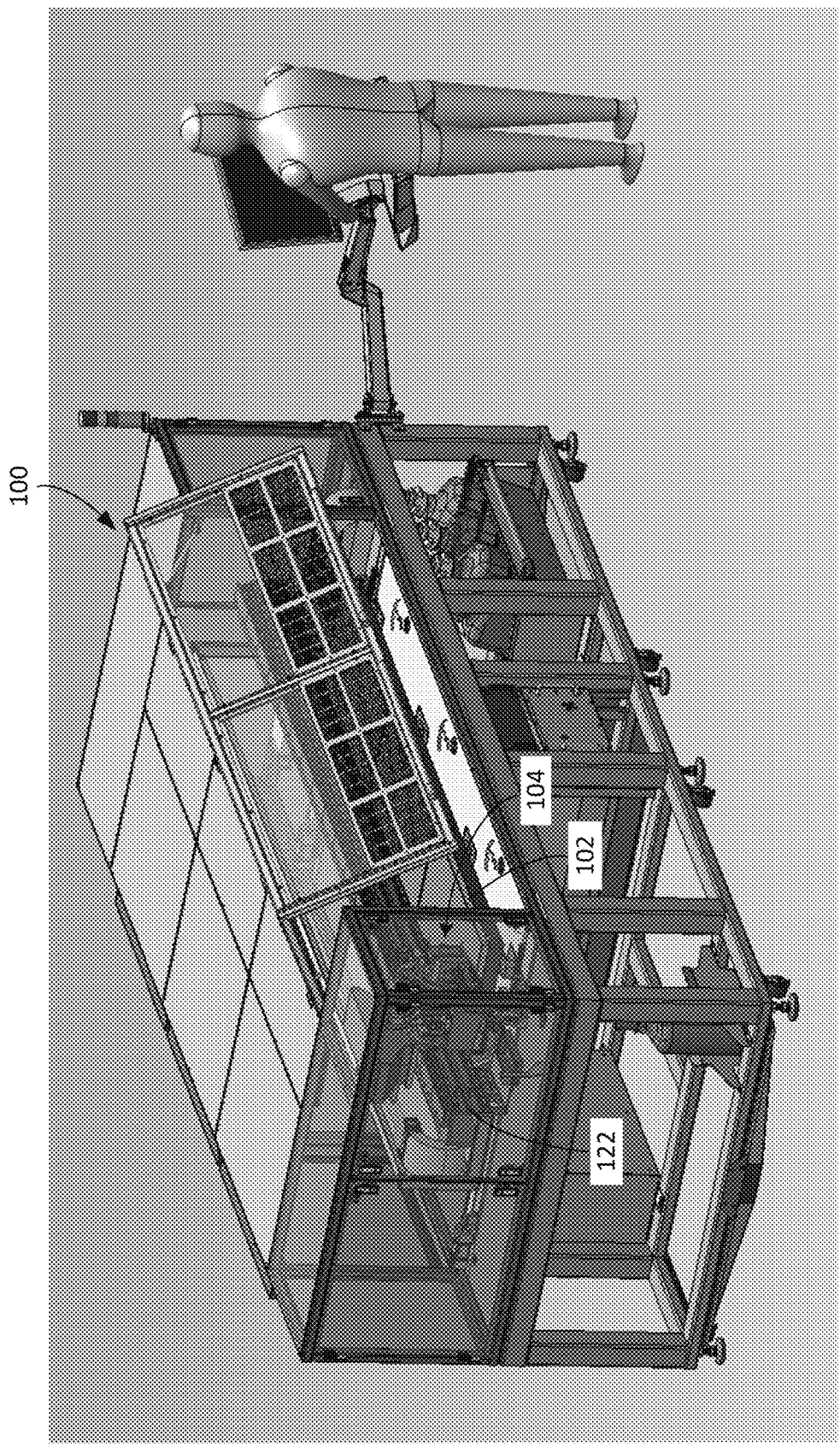
FIG. 1 is a schematic perspective view of an additive manufacturing apparatus.
Figure 3A:
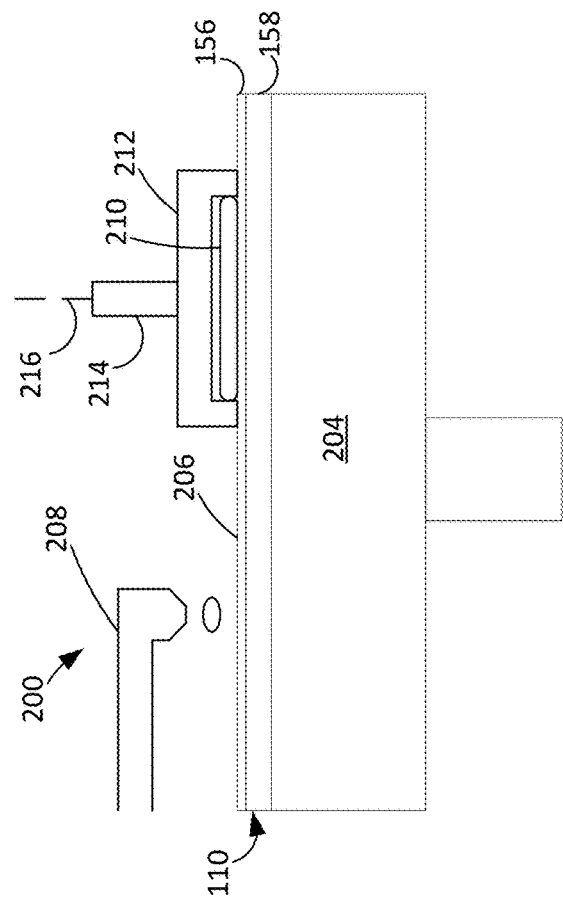
FIG. 3A is a schematic top view of an additive manufacturing apparatus.
Figure 3B:
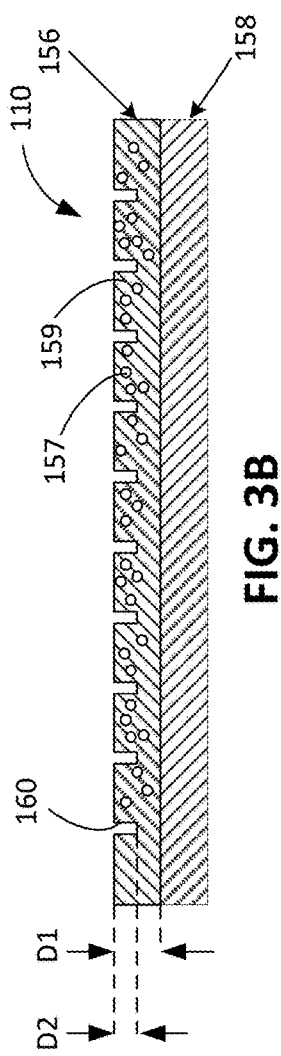
FIG. 3B is a schematic top view of another implementation of an additive manufacturing apparatus.

FIG. 1 depicts a perspective view of an example of an additive manufacturing apparatus 100 for forming articles, e.g., polishing pads. The apparatus 100 includes at least one platform 102 having an adjustable tilt, e.g., an angle of the platform 102 relative to a horizontal plane. The apparatus 100 includes one or more printheads 104 supported above the platform 102. For example, referring to FIG. 4, the apparatus 100 includes a printhead 104 supported above the platform 102 that dispenses successive layers of feed material 106 on a top surface 108 of the platform 102. During a manufacturing operation, the layers of feed material 106 can form a polishing pad 110 (see FIGS. 3A and 3B).

Figure 2A:
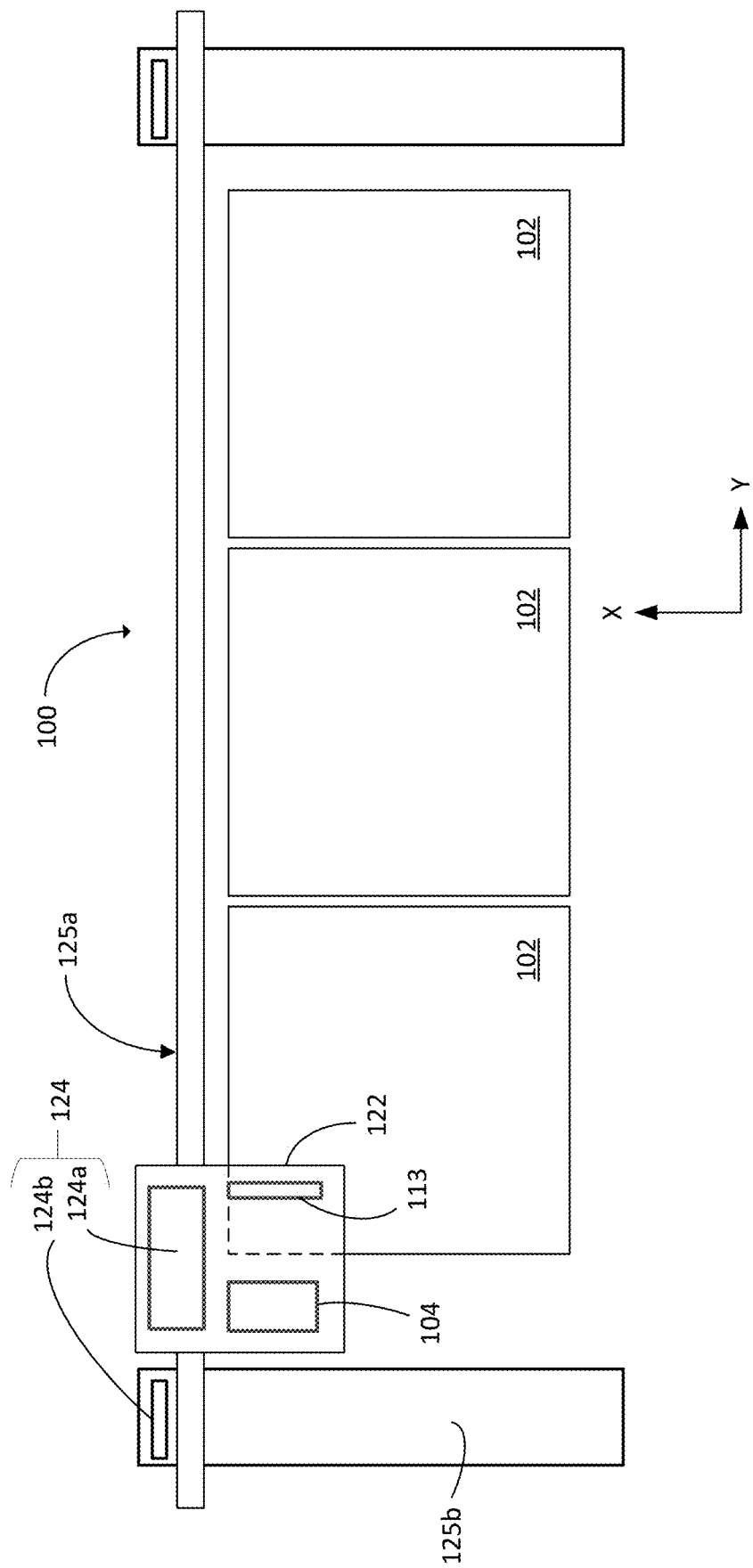
FIG. 2A is a schematic side view of a polishing station.

As shown in FIG. 2A, in some implementations the apparatus 100 includes a plurality of platforms 102, e.g., three platforms, arranged in a linear array. However, the apparatus 100 could include more than three platforms, and the platforms could be arranged in a two-dimensional array (e.g., a rectangular array) rather than a linear array.

Figure 2B:
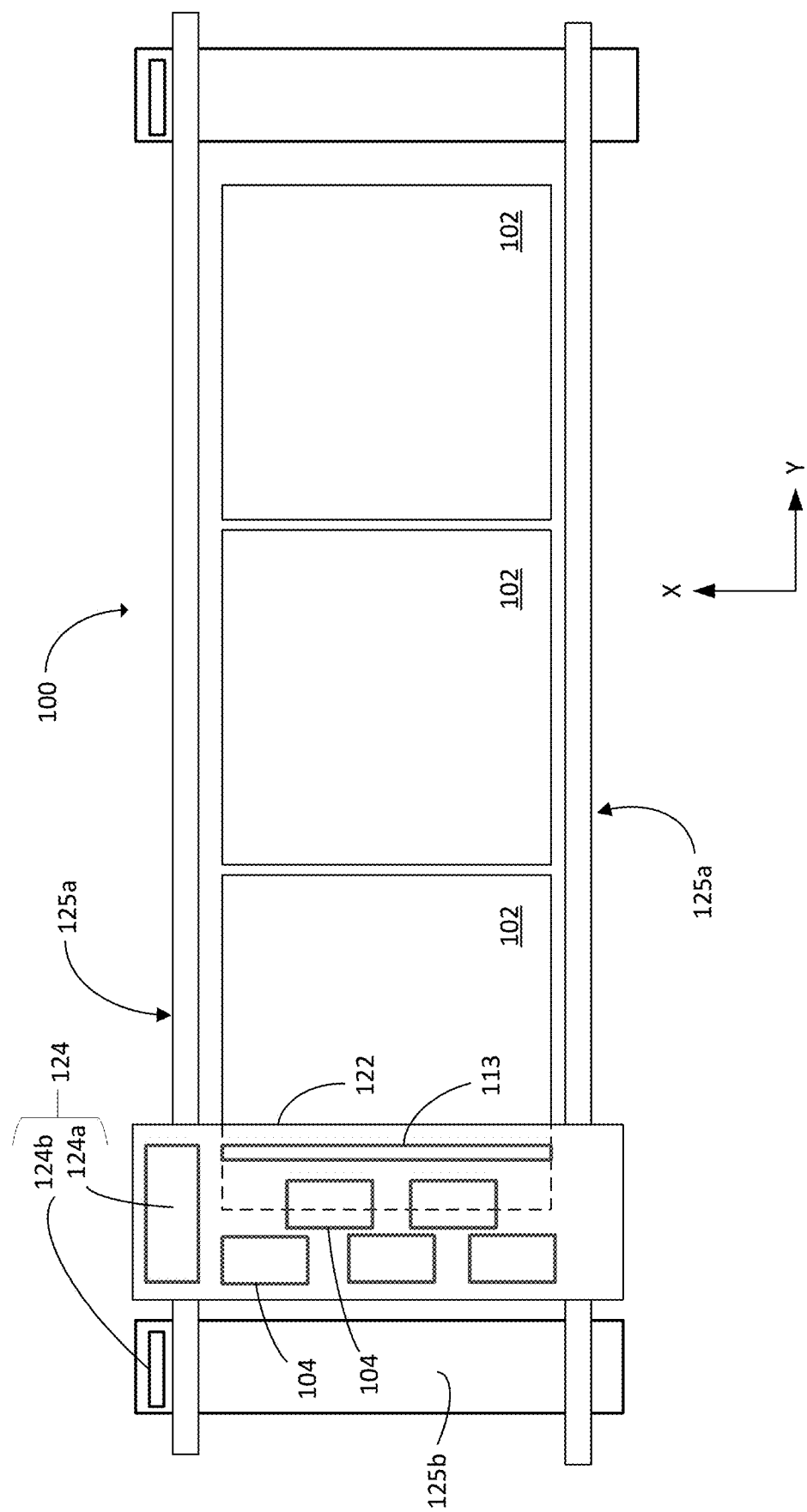
FIG. 2B is a schematic side view of a polishing pad.

Also as shown in FIGS. 2A and 2B, the printhead 104 is mounted on a support 122 arranged above the platform 102. The support 122 is at least movable in a first scanning direction that is along the direction of the linear array of the platforms, e.g., the Y-axis as shown in FIGS. 2A and 2B. The apparatus includes an actuator system 124, such as a linear translation mechanism with a linear guide, that is operable to move the support 122 horizontally in the first scanning direction. For example, the support 122 and printhead 104 can be coupled to a rail 125a that extends along the Y-axis, and a linear actuator 124a that is part of the actuator system 124 can drive the support along the rail 125.

In some implementations, e.g., as shown in FIG. 2A, the printheads 104 are not wide enough to span the build area of the platform 102. In this case, the support 122 is also movable by the actuator system 124 in a second scanning direction that is perpendicular to the first scanning direction, e.g., the X-axis as shown in FIG. 2A. For example, the rail 125a can be coupled to cross-rails 125b that extend along the X-axis, and a linear actuator 124b can drive the rail 125a along the cross-rails 125, thus carrying the support 122 and printhead 124 along the X-axis.

In some implementations, e.g., as shown in FIG. 2B, the one or more printheads 104 are wide enough to span the build area of the platform 102. For example, a plurality of prinheads 104 can be arranged in two or more columns to form a staggered array. In this case, the support can be horizontally movable by the actuator system 124 in only the first scanning direction, i.e., along the Y-axis but not the X-axis.

In some implementations, e.g., as shown in FIG. 2B, the support 122 is a gantry suspended on supports, e.g., two rails 125a, that are arranged on opposite sides of the platform 102. Alternatively, e.g., as shown in FIG. 2A, the support is held in a cantilever arrangement on just one side of the platform, e.g., on a single rail 125a. Of course, the one or more printheads that span the build area of the platform 102 can be held on the cantilever arrangement, or the single printhead that does not span the build area of the platform 102 can be held on the gantry arrangement. In this later case, the printhead 102 could be movably mounted on the platform, e.g., to move along the X-direction as driven by a linear actuator. In addition, the support 122 could be suspended from on a rail that extends over the platforms 102, or the support could be held by a multi-axis robot.

Figure 4:
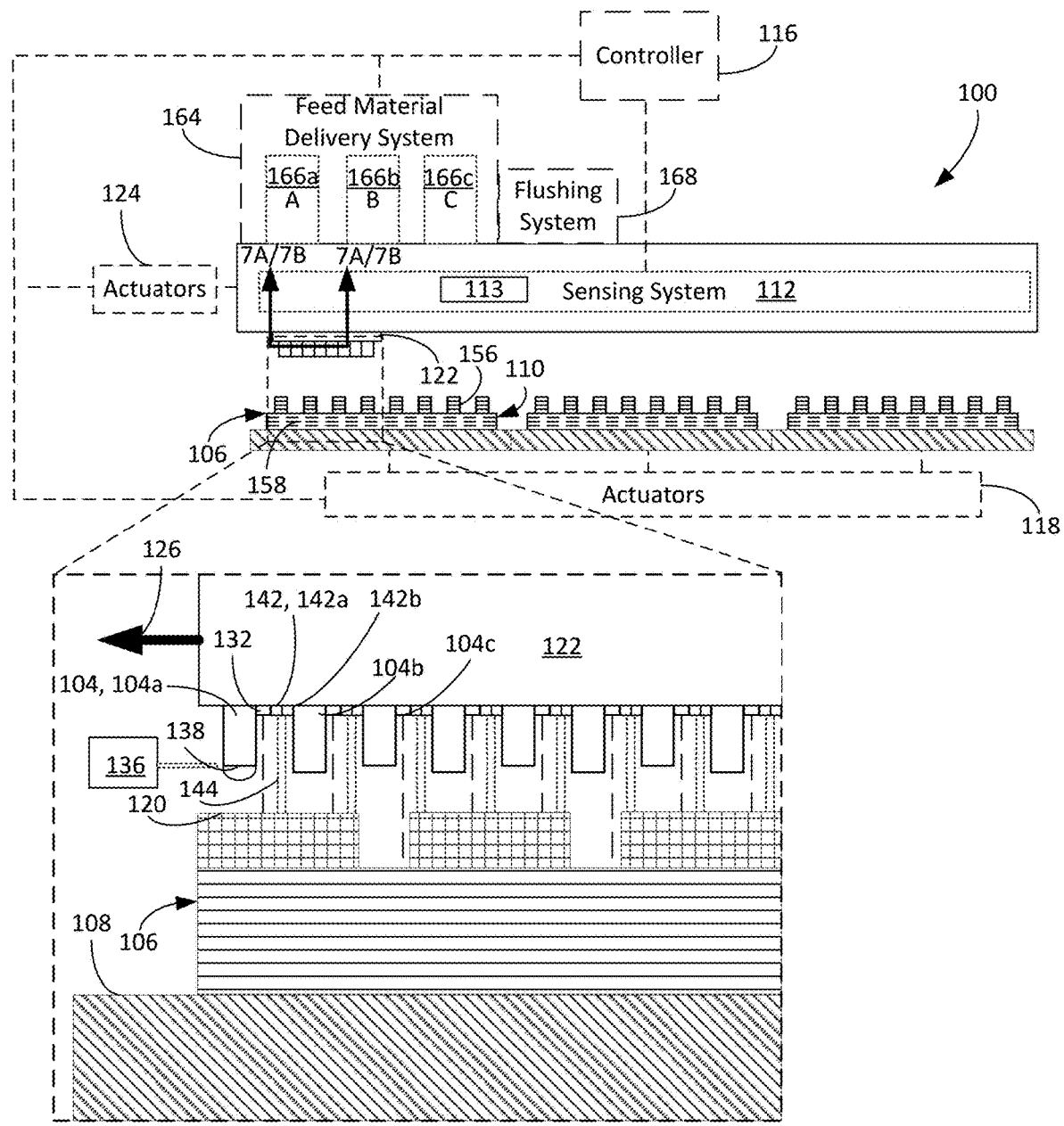
FIG. 4 is a schematic side view of an additive manufacturing apparatus including a schematic block diagram of a control system for the additive manufacturing apparatus.
Figure 5:
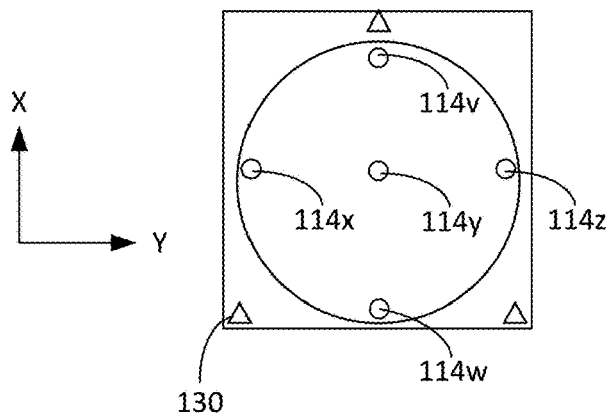
FIG. 5 is a schematic top view of a platform of an additive manufacturing apparatus.

As shown in FIG. 4, the apparatus 100 includes a sensing system 112 to detect a height of the platform 102 and/or the height of the top surface of the layers of feed material 106. FIG. 5, which depicts a top view of the platform 102, shows multiple horizontally spaced points 114 at which the sensing system 112 can detect the height of a top surface 120 of the platform 102 and/or the height of the top surface of the layers of feed material 106.

The apparatus 100 includes a controller 116 that selectively operates an actuator system 118 to adjust the tilt of the platform 102 based on, for example, signals from the sensing system 112. The tilt of the platform 102 is adjusted based on the detected height at each of the points 114.

The actuator system 118 can be operated such that the top surface 120 is moved closer to horizontal, for example, before the printhead 104 dispenses the layers of feed material 106. Alternatively or in addition, the actuator system 118 can be operated such that the top surface of the layers of feed material 106 is moved closer to horizontal, for example, between dispensing of each layer of the plurality of layers of feed material 106. When the top surface is closer to horizontal, feed material dispensed on the top surface can be less likely to shift position while being deposited. This can improve fidelity of the printed article to the desired shape.

The controller 116, for example, selectively operates the actuator system 124 to create relative vertical motion between the support 122 and the platform 102. For example, after each layer is dispensed, the actuator system 124 could be used to lift the printhead 104 by a height equal to the thickness of a deposited layer of feed material. In some implementations, although the platform 102 can tilt, it does not translate vertically. Rather, the support 122 is moved vertically. For example, the actuator system 124 can move the support 122, and hence the printhead 104, vertically, based on the detected height of the surface 120 at each of the points 114. In some cases, the actuator system 124 includes a first actuator to move the support 122 vertically and a second actuator to move the support 122 horizontally.

As noted above, the sensing system 112 detects the height of a surface on the platform 102, e.g., the upper surface 120 is on the platform 102. In some cases, the controller 116 selectively operates the actuator system 118 before the printhead 104 dispense the layers of feed material, and the surface 120 thus corresponds to a top surface 108 of the platform 102. Alternatively or additionally, the controller 116 selectively operates the actuator system 118 during a dispensing operation of the printhead 104, and thus the upper surface 120 corresponds to a surface above the platform 102. The surface 120 is, for example, a top surface of the layers of feed material 106. The sensing system 112 detects a height of the top surface 120 of the layers of feed material 106 at each of the points 114, and the controller 116 selectively operates the actuator system 118 to adjust the tilt of the platform 102 based on the detected height of the top surface of the layers of feed material 106 at each of the points 114.

The sensing system 112 can also be used to detect defects, e.g., pits or raised protrusions. This permits the controller to modify the dispensing pattern so that corrections can be made, e.g., by filling up the pits or avoiding ejecting onto the protrusions.

In some implementations, the sensing system 112 includes a non-contact sensor 113 to detect the height of the layers of feed material 106 at each of the points 114. The non-contact sensor can be, for example, a time-of-flight optical sensor that generates a signal indicative of a distance between the sensor and the upper surface 120.

In some cases, the sensor 113 is mounted on the support 122 with the printhead 104. Thus, the sensor 113 and printhead 104 move together, and the signal from the sensor indicative of the distance between the printhead 104 and the upper surface.

In some cases, the sensor 113 is mounted separately, e.g., on a frame that support the platforms 102 and support system. In this case, the support 122 and the printhead 104 are movable relative to the sensor 113.

In some implementations, the sensing system 112 includes multiple sensors 113. For example, there can be multiple sensors 113 arranged along the second axis, e.g., along the X-axis. Each sensor detects the height at a different spot along the second axis. As the support 112 scans along the Y-axis, the sensors 113 can accumulate the height measurements for the different points 114. For example, the sensing system 112 could include three sensors, a first sensor that provides the measurement for point 114$v$, a second sensor that provides the measurement for point 114$w$, and a third sensor that provides the measurement for points 114$x$, 114$y$ and 114$z$ as the support 122 scans along the Y-axis (see FIG. 5).

In some implementations, the sensing system 112 includes a sensor for each of the points 114. For example, if the apparatus 100 is configured produce a single polishing pad 110 in the scanning direction 126 of the printhead 104, referring to FIG. 5A, each of five sensors detects the height at one of the five points 114 above where the polishing pad 110 is to be formed, e.g., on the layers of feed material 106 tor on the top surface 120 of the platform 102.

Using the detected height at each of the multiple points 114, the controller 116 determines a height skew indicative of a difference between heights of the upper surface 120 at the five points 114. To reduce the height skew, the controller 116 selectively operates the actuator system 118 to pivot the platform 102, thereby reducing the height at some of the points 114 and increasing the height at some of the points 114.

In some cases, the controller 116 determines a flatness based on the signals from the multiple sensors. The controller 116 operates the actuator system 118 to attain a flatness less than a predefined threshold. The predefined threshold depends on, in some cases, the size of the platform 102. For example, for a platform 102 of a length of 3 meters (in the scanning direction), the flatness threshold is, e.g., less than 50 microns, less than 30 microns, etc.

In some implementations, some or all of the points 114 are positioned proximate to where a perimeter 128 of the polishing pad 110 is to be formed. These points (points 114$v$, 114$x$, 114$z$ and 114$w$) are, for example, within 1 and 10 centimeters from the location of the perimeter 128. Alternatively or additionally, these points 114 can be positioned at equal angular intervals around a vertical axis through a center 129 of where the polishing pad 110 is to be formed. In some cases, the points 114 are positioned symmetrically about the vertical axis through the center 129. In some examples, the points 114 include a center point (point 114$y$) positioned at the center 129.

In some cases, the number of points 114 per polishing pad at which the height is sensed may vary. In some cases, the points 114 include four points, e.g., two pairs of points, each pair being positioned along different perpendicular horizontal axes that intersect at the center 129. However, other quantities of points are possible, for example, 5-10 points, 10-15 points, etc.

In some implementations, the actuator system 118 is operable to lower the platform 102 after each of the layers of feed material 106 is dispensed. The controller 116 operates the actuator system 118 to lower the platform 102 by an amount equal to the height of a layer of the feed material 106. Consequently the system 100 can maintain a constant height offset between the top surface of the feed material 106 and the printhead 105 from layer-to-layer.

In some implementations, the actuator system 118 includes vertical actuators 130 that configured to tilt the platform 102. The actuator system 118 can be configured to controllably tilt the platform 102 about a selectable horizontal axis. Each vertical actuator 130, for example, is positioned to raise or lower a portion of the platform 102. The platform 102 can be pivotally coupled to the top end of the each of the vertical actuators 130. So spots where the platform 102 is coupled to the vertical actuator 130 can be vertically fixed but free to tilt relative to the top end of the vertical actuator 130. For example, the platform 102 can be connected to each vertical actuator by a ball-and-socket joint, a dual-axis gimbal connection, or similar joint that permits rotation about two perpendicular horizontal axes. In this regard, as the vertical actuators 130 are selectively actuated, the tilt of the platform 102 is adjusted.

At least some of the vertical actuators 130 are positioned at different angular positions around the vertical axis through the center 129. The vertical actuators 130 can be located outside of the location of the perimeter 128. In some cases, there are three vertical actuators 130; appropriate activation of the actuators 130 can controllably tilt the platform 102 about an arbitrary horizontal axis that extends through the center 129. In some cases, the center of the platform 102 can be held vertically fixed but pivotable about two perpendicular horizontal axes, and two vertical actuators 130 can be coupled to the platform at locations 90° apart around the center 129.

Figure 5A:
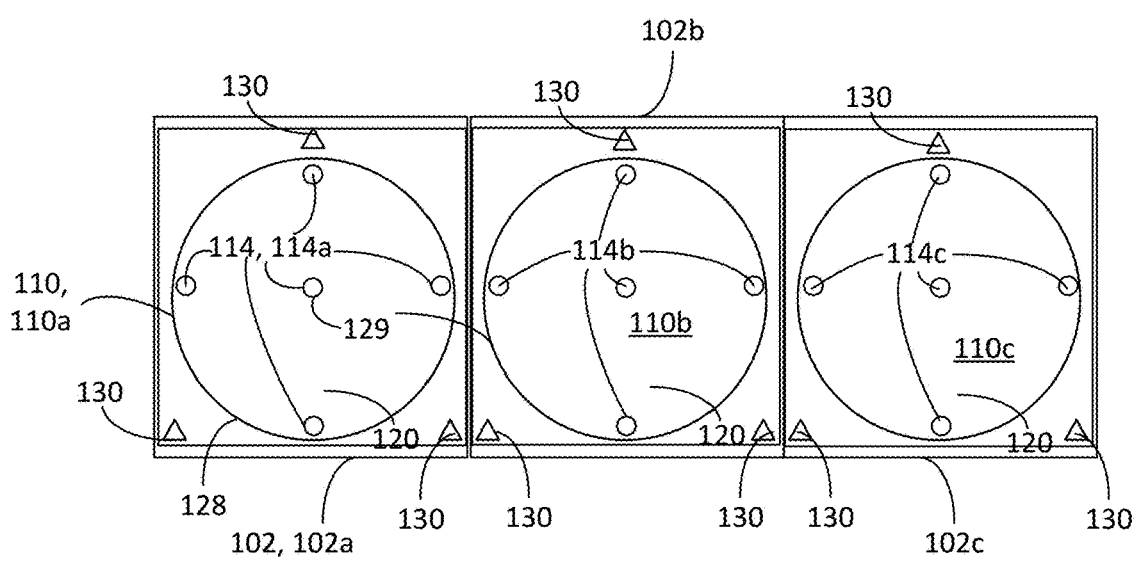
FIGS. 5A and 5B are schematic top views of platforms of an additive manufacturing apparatus.

In some implementations, the apparatus 100 is configured to produce multiple polishing pads in the scanning direction 126 of the printhead 104. As shown in FIG. 5A, the apparatus 100 includes, for example, platforms 102a, 102b, 102c to support corresponding the corresponding polishing pad 110a, 110b, 110c. Each platform 102a, 102b, 102c includes independently operable actuators 130. As a result, each platform 102a, 102b, 102c has an independently adjustable tilt. The apparatus 100 further includes sensors to detect heights at points 114a for the platform 102a, heights at points 114b for the platform 102b, and heights at points 114c for platform 102c.

Figure 5B:
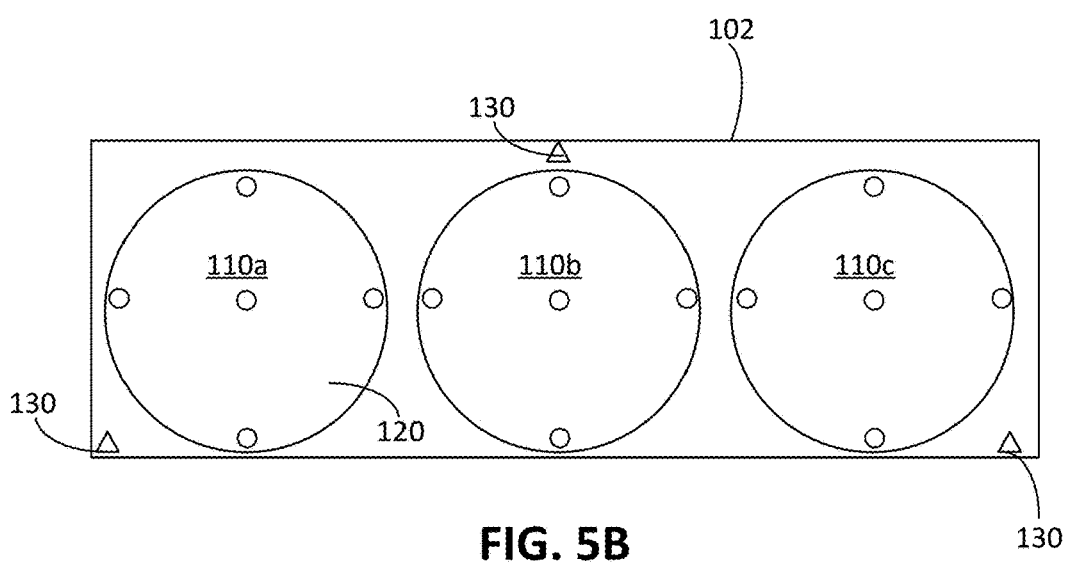

In some implementations, referring to FIG. 5B, a single platform 102 is sized to carry multiple polishing pads, e.g., three polishing pads 110a, 110b, 110c, in the scanning direction of the printhead 104. In contrast to implementations in which the sensors detect the height of the upper surface 120 where a single polishing pad 110 is to be formed, in some cases, the apparatus 100 includes sensors to detect heights of the upper surface at each of the locations where multiple polishing pads 110a, 110b, 110c are to be formed. The controller 116 adjusts the tilt of the platform 102 based on the detected heights of each of the upper surfaces where multiple polishing pads 110a, 110b, 110c are to be formed.

The tilt of the platform 102 is adjusted to compensate for a height skew of each of the areas where the polishing pads 110a, 110b, 110c are to be formed. The apparatus 100 includes independently controllable vertical actuators 130, e.g., three vertical actuators 130, that the controller 116 operates to adjust the tilt of the platform 102, and hence the height skew of each of the areas where the polishing pads 110a, 110b, 110c are to be formed.

Returning to FIG. 4, in some implementations of the additive manufacturing apparatus 100, the sensing system 112 monitors dispensing operations of multiple printheads 104a, 104b as the printheads 104a, 104b dispense the layers of feed material 106. The sensing system 112 includes an optical sensor 132 to monitor a dispensing operation of the printhead 104a. As the controller 116 operates the printheads to successively dispense the layers of feed material 106, the optical sensor 132 monitors a dispensing operation of the printhead 104a. The controller 116, using the optical sensor 132, detects an error condition associated with the printhead 104a while the printheads 104a, 104b are dispensing the feed material. The controller 116 detects the error condition, for example, while operating the printheads 104a, 104b to dispense the layers of feed material on the platform 102. In response to detecting the error condition, the controller 116 adjusts a dispensing operation of the printhead 104b.

In some implementations, the optical sensor 132 of the sensing system 112 is positioned and oriented to monitor the layers of feed material 106. The optical sensor 132 could, for example, direct a light beam toward the layers of feed material 106 and receive and measure an intensity of light reflected from the layers of feed material. Alternatively, the optical sensor 132 could operate under passive lighting. The optical sensor 132 can be a camera.

Alternatively or additionally, the sensing system 112 includes an optical sensor 136 positioned to monitor a condition of the nozzle 138 to monitor the dispensing operation of the printhead 104a. The optical sensor 136 is, for instance, positioned to image the nozzle 138 and/or feed material ejected from the nozzle. Thus the controller 116, using the optical sensor 136, can detect an error condition associated with the nozzle 138.

In some implementations, the printheads 104a, 104b are adjacent to one another such that the dispensing operation of one printhead can compensate for an error in the dispensing operation of the other printhead. The error condition for the printhead 104a corresponds to, for example, a condition in which the printhead 104a is not functioning properly. The controller 116 adjusts the dispensing operation of the printhead 104b to reduce the impact of the error condition of the printhead 104a on features of the polishing pad 110 to be formed. The controller 116, for example, adjusts the dispensing operation of the printhead 104b by increasing a rate at which the feed material is delivered from the printhead 104b. If the printhead 104a is adjacent to the printhead 104b, the increased rate of dispensing of the printhead 104b compensates for the decreased rate of dispensing of the printhead 104a.

In some implementations, the error condition associated with the printhead 104a corresponds to an error condition associated with a nozzle 138 of the printhead 104a. Alternatively or additionally, the optical sensor 136 is positioned within the printhead 104a to monitor conditions of the nozzle 138 within the printhead 104a, e.g., to detect a condition of a nozzle plate of the printhead 104a. The error condition for the printhead 104a corresponds to, for example, a nozzle clog in which the feed material obstructs the flow pathway through the printhead 104a for the feed material. The nozzle clog impedes the rate at which the feed material can be dispensed from the printhead 104a. In some cases, the error condition associated with the nozzle 138 corresponds to accumulation of feed material, e.g., pooling or puddling, of feed material in the nozzle 138 or on a nozzle plate of the printhead 104a.

In some cases, the optical sensor 136 is positioned to monitor the dispensing operation of the printhead 104a by monitoring a drop of feed material after the feed material has been dispensed by the printhead 104a. The optical sensor 136 is positioned, for example, below the printhead 104a. The optical sensor 136 is, for example, a camera, e.g., a CCD device, to detect the drop of feed material as it is falling from the printhead 104a. The camera captures images of the drop of feed material, and the controller 116 analyzes the images to determine characteristics of the drop of feed material. The controller 116 can, for example, determine a drop velocity, a drop trajectory, and/or a drop uniformity of the drops of feed material. If one or more of these features of a drop of feed material is outside of a predefined range, e.g., a normal operating range, the controller 116 detects an error condition associated with the printhead 104a.

In some implementations, the sensing system 112 monitors the dispensing operation of the printhead 104a after the feed material ejected from the printhead 104a is dispensed on the platform 102. The optical sensor 136, for example, received light reflected by the already dispensed layer of feed material 106. For example, the optical sensor can be a camera, e.g., a CCD device. The controller 116 detects the error condition associated with the printhead 104a by, for example, determining that a parameter of a feature of the layers of feed material 106 is outside of the predefined range. For example, the controller 116 can compare the image from the camera to an expected image for the layer being dispensed, and indicate an error if there is a discrepancy. The feature of the layers of feed material 106 corresponds to, for instance, a geometry of the layers of feed material 106 at a location directly below the printhead 104a, a free energy of the feed material at a location directly below the printhead 104a, and/or other features indicative of the functionality of the printhead 104a. In some cases, if the optical sensor 132 monitors the surface free energy of the layers of feed material 106, the controller 116 detects a surface free energy modification indicative of, for example, a crack in the layers of the feed material 106.

In some implementations, the controller 116 operates the printheads 104a, 104b to dispense a test pattern of feed material positioned outside of a portion of the layers of feed material 106 to be formed into the polishing pad 110, e.g., outside each of the portions of the layers of feed material 106 to be formed into the polishing pads 110a, 110b, 110c. The controller 116 operates the printheads 104a, 104b to dispense the test pattern, for example, before dispensing the layers of feed material 106 to be formed into the polishing pad 110. In some cases, the controller 116 operates the printheads 104a, 104b to dispense the test pattern after each of the layers of the feed material is dispensed.

As the printheads 104a, 104b dispense the test pattern of feed material, the sensing system 112, e.g., the optical sensor 132 or the optical sensor 136, monitors the dispensing operation of the printhead 104a. The controller 116 can detect an error condition, as described herein, while the sensing system 112 monitors the printheads 104a, 104b dispensing the test pattern of feed material. In some cases, the sensing system 112 includes an imaging device to capture an image of the test pattern of feed material after it has been dispensed on the platform 102. The controller 116 compares the image of the test pattern of feed material to a stored image of the test pattern, e.g., an image of the test pattern of feed material absent any error conditions. The controller 116 then determines which of the printheads 104a, 104b, if any, has an associated error condition.

Upon detecting an error condition associated with the printhead 104a through one of the methods described herein, the controller 116 can generate an alert to a user and/or adjust the dispensing operation to compensate. In some implementations, the controller 116 adjusts the dispensing operation of the printhead 104b such that the overall rate of feed material dispensed from the printheads 104a, 104b is maintained at a predefined level. In some cases, the controller 116 adjusts the dispensing operation of two or more printheads adjacent to the printhead 104a experiencing the error condition.

The layers of feed material 106 are formed into the polishing pad 110, for example, through a curing operation. Each layer can be cured before the next layer is dispensed. Referring to FIG. 4, the apparatus 100 includes, for example, an energy source 142 that emits radiation toward the platform 102 to cure the feed material. In some implementations, the energy source 142 is mounted on and moves with the support 122. In some implementations, the energy source 142 is mounted separately, e.g., on a wall of the apparatus or above the build platform, and remains fixed in place.

In some implementations, the energy source 142 emits a radiation beam 144. The radiation beam 144, for example, covers an area of the platform 102 that is smaller than the usable build area of the platform 102. If the radiation beam does not cover the width of the build area on the platform, then the beam 144 can be scanned, e.g., along the X direction. In some cases, the energy source 142 emits multiple beams of radiation to cure a single layer of the feed material 106. In some cases, the energy source 142, when activated, emits a beam of radiation that covers an area whose width extends across the usable build area, e.g., the entire width of the usable area. In some implementations, the energy source 142, when activated, emits a beam of light that covers the entire usable build area. If the emitted radiation from the energy source 142 covers the usable build area upon activation of the energy source 142, the energy source 142 is, for example, activated after the printhead 104 dispenses all of the feed material 106 in a layer. If the radiation from the energy source 142 extends across the width of the build area, the energy source 142 can be scanned horizontally as each layer of feed material is dispensed. For example, in this case, the energy source 142 is mounted on the support 122 with the printhead 104, and can cure the feed material as the support is scanning across the platform 102. If the apparatus 100 includes multiple printheads, the apparatus 100 can include an energy source mounted on the support 122 for each printhead.

In another example of the additive manufacturing apparatus 100, the apparatus 100 includes multiple energy sources to emit radiation beams toward the layers of feed material 106. Referring back to FIG. 4, the apparatus 100 includes, for example, energy sources 142a, 142b. The energy sources 142a, 142b are supported on the support 122 above the platform 102 to emit radiation beams 144a, 144b, respectively, toward the layers of feed material 106. The controller 116 selectively operates the energy sources 142a, 142b.

During dispensing operations, the controller 116 operates the printhead 104 to dispense, referring to FIG. 6A, a drop of feed material 146 on the platform 102. The drop of feed material 146 includes an exterior surface 148 and an interior volume 150. After operating the printhead 104 to dispense the drop of feed material 146, as shown in FIG. 6B, the printhead 104 operates the energy source 142a to emit the radiation beam 144a toward the drop of feed material 146. When exposed to the radiation beam 144a, the exterior surface 148 of the drop of feed material 146 begins to cure. The controller 116 then operates the energy source 142b, referring to FIG. 6C, to emit the radiation beam 144b toward the drop of feed material 146. The radiation beam 144b cures the interior volume 150 of the drop of feed material 146.

The energy source 142a cures the exterior surface 148 of the drop of feed material 146, for example, to initialize the curing process of the drop of feed material 146. This initial curing of the exterior surface 148 can stabilize the drop of feed material 146 so as to inhibit motion of the feed material. The energy source 142b can emit the radiation beam 144b to complete the curing process of the drop of feed material 146 by curing the interior volume 150 of the drop of feed material 146.

In some implementations, the radiation beam 144a emitted by the energy source 142a has a wavelength less than a wavelength the radiation beam 144b emitted by the energy source 142b. The energy sources 142a, 142b are, for example, ultraviolet (UV) light sources that emit beams of UV light. The UV light can have a wavelength between, for example, 10 nm to 400 nm (e.g., 10 to 320 nm, 320 to 400 nm, 320 nm to 360 nm, 340 nm to 380 nm, 380 nm to 400 nm, 350 nm to 370 nm, approximately 355 nm, approximately 365 nm). The wavelength of the radiation beam 144a is, for example, a shorter UV wavelength between 290 nm and 385 nm, while the wavelength of the radiation 144b is a longer UV wavelength between 385 nm and 405 nm. The high energy of the short UV wavelength of the radiation beam 144a enables it to quickly cure the exterior surface 148 of the drop of feed material 146 to stabilize the drop of feed material 146. In contrast, the lower energy of the longer UV wavelength of the radiation beam 144b enables it to more uniformly cure the interior volume 150 of the drop of feed material 146.

In some implementations, the controller 116 operates the energy sources 142a, 142b such that the drop of feed material 146 is simultaneously exposed to both of the radiation beams 144a, 144b. The energy sources 142a, 142b are, for example, positioned relative to one another on the support 122 such that the energy sources 142a, 142b, when simultaneously activated, expose a dispensed drop of feed material, e.g., the drop of feed material 146, to both the radiation beams 144a, 144b simultaneously.

If the printhead 104 is movable across the platform 102, e.g., the printhead 104 is mounted on a horizontally movable support 122, the energy sources 142a, 142b are both positioned behind the printhead 104 in the scanning direction 126. In this regard, during a manufacturing operation, the controller 116 operates the printhead 104 to dispense feed material. The controller 116 then operates the actuator system 124 to scan the support 122 holding the printhead 104 and the energy sources 142a, 142b by an increment in the scanning direction 126. The increment is sufficiently large to reposition the energy sources 142a, 142b above the feed material dispensed by the printhead 104. In this regard, the energy sources 142a, 142b are positioned such that, when they are activated, the dispensed feed material is exposed to both of the emitted radiation beams 144a, 144b.

In some implementations, the drop of feed material 146 is exposed to the radiation beams 144a, 144b sequentially. The energy source 142b is, for example, positioned behind the energy source 142a along the scanning direction (i.e., the Y-axis). The energy sources 142a, 142b can be positioned relative to one another such that the drop of feed material 146 is exposed to only one of the radiation beams 144a, 144b at a time. In this regard, the energy sources 142a, 142b may be simultaneously activated to expose different drops of feed material and/or different voxels to radiation. The drop of feed material 146, in some cases, is exposed to the radiation beam 144a first such that the drop of feed material 146 is stabilized and then is exposed to the radiation beam 144b to complete the curing process of the interior volume 150.

In some implementations, the controller 116 selectively operates the energy sources 142a, 142b in response to sensor feedback from, e.g., the optical sensor 132. The controller 116 operates the energy sources 142a, 142b, for example, when the drop of feed material 146 has a diameter within a desired range. The optical sensor 132 monitors the drop of feed material 146, and the controller 116 determines when the drop of feed material 146 has the desired diameter. The optical sensor 132 is, for example, a high-speed camera that captures images of the drops of feed material as they are dispensed. The controller 116 determines based on the captured images when a particular drop of feed material reaches the desired diameter and then activates the energy sources 142a, 142b.

While the energy sources 142a, 142b are described as exposing a single drop of feed material to the radiation beams 144a, 144b, in some cases, the energy sources 142a, 142b emit radiation beams 144a, 144b that irradiate multiple drops of feed material at once. In some implementations, the controller 116 operates the printhead 104 to dispense a line of feed material 152, as shown in FIG. 6D. In some implementations, the energy sources 142a, 142b emit radiation beams 144a, 144b that expose an elongate portion of the layers of feed material 106, for example, to cure the line of feed material 152. The elongate portion, in some cases, extends along a horizontal direction perpendicular to the scanning direction 126 of the support 122. In some implementations, the controller 116 operates the printhead 104 to dispense the line of feed material 152. In some cases, the line of feed material 152, when cured, forms a line going across the entire length of the polishing pad 110. The line of feed material 152 includes several drops of feed material that have coalesced. In some cases, the energy sources 142a, 142b are configured such that the emitted radiation beams 144a, 144b span across an entire length of the polishing pad 110 to be formed. In this regard, when the energy sources 142a, 142b are activated, the entire line of feed material 152 is exposed to the emitted radiation beams 144a, 144b. The controller 116 operates the energy source 142a to cure an exterior surface 154 of the line of feed material 152. The controller 116 then operates the energy source 142b to cure an interior volume 155 of the line of feed material 152. In some cases, the line of feed material 152 is exposed simultaneously to both of the radiation beams 144a, 144b. The printhead 104 is operable to dispense successive lines of feed material to form a layer of feed material.

In some implementations, the energy sources 142a, 142b are operated after each layer of feed material is dispensed. In some implementations, the energy source 142a to cure the exterior surface 148 of the drop of feed material 146 is operated after each drop of feed material 146 is dispensed, and the energy source 142b to cure the interior volume 150 of the drop of feed material is operated after each line of feed material 146 is dispensed.

In some implementations, the energy source 142a includes a bank of energy emitters. Alternatively or additionally, the energy source 142b includes a bank of energy emitters. The banks of energy emitters of the energy sources 142a, 142b extend, for example, along a horizontal direction perpendicular to the scanning direction 126 of the support 122. The banks of energy emitters emit radiation beams that extend across the platform 102 in the horizontal direction perpendicular to the scanning direction 126.

The polishing pad 110 is formed from a predetermined number of layers of feed material being dispensed and cured. In an example of a polishing pad 110 depicted in FIG. 3B, the polishing pad 110 is a multi-layer pad. The polishing pad 110, for example, includes a polishing layer 156 and a backing layer 158. The polishing layer 156 is formed of a material that is, for instance, inert when the polishing pad 110 is used to polish a substrate. The material of the polishing layer 156 can be a plastic, e.g., a polyurethane, a acrylate, or a multi-plastic composite. In some implementations, the polishing layer 156 is a relative durable and hard material. The polishing layer 156 has a hardness of, for example, about 40 to 80, e.g., 50 to 65, on the Shore D scale.

In some implementations, the polishing layer 156 is layer of homogeneous composition. The polishing layer 156 can include pores 157 suspended in a matrix 159 of plastic material, e.g., polyurethane, acrylate, or a composite plastic. The pores 157 can be provided by hollow micro-spheres suspended in the matrix 159, or by voids in the matrix 159 itself, by particles of water-soluble material.

In some implementations the polishing layer 156 includes abrasive particles held in the matrix 159 of plastic material. The abrasive particles 157 are harder than the material of the matrix 159. The material of the abrasive particles can be a metal oxide, such as ceria, alumina, silica or a combination thereof.

In some implementations, the polishing layer 156 has a thickness D1 of 80 mils or less, e.g., 50 mils or less, e.g., 25 mils or less. Because the conditioning process tends to wear away the cover layer, the thickness of the polishing layer 156 can be selected to provide the polishing pad 110 with a useful lifetime, e.g., 1000 polishing and conditioning cycles.

In some implementations, the polishing layer 156 includes recesses 160, e.g., grooves. The recesses 160 can carrying slurry. The recesses 160 form a pattern, such as, for example, concentric circles, straight lines, a cross-hatched, spirals, and the like. Thus, the recesses can be grooves, or the recess can a connected region that surrounds multiple posts or pillars that provide the polishing surface. If grooves are present, the plateaus between the grooves 160 are, for example, approximately 25-90% of the total horizontal surface area of the polishing pad 110. The grooves 160 occupy, for example, approximately 10%-75% of the total horizontal surface area of the polishing pad 110. The plateaus between the grooves 160 can have a lateral width of about 0.1 to 2.5 mm.

In some implementations, e.g., if there is a backing layer 158, the grooves 160 extend entirely through the polishing layer 156. In some implementations, the grooves 160 extend through about 20-80%, e.g., 40%, of the thickness of the polishing layer 156. The depth of the grooves 160 is, for example, 0.25 to 1 mm. In some cases, for example, in a polishing pad 110 having a polishing layer 156 that is 50 mils thick, the grooves 160 have a depth D2 of about 20 mils.

In some implementations, the backing layer 158 are softer and more compressible than the polishing layer 156. The backing layer 158 has, for instance, a hardness of 80 or less on the Shore A scale, e.g., a hardness of about have a hardness of 60 Shore A. The backing layer 158, in some cases, is thicker or thinner or the same thickness as the polishing layer 156.

The polishing pad 110 can be used to polish one or more substrates at a polishing apparatus. A description of a suitable polishing apparatus can be found in U.S. Pat. No. 5,738,574. In some implementations, referring to FIG. 2, a polishing system 200 includes a rotatable platen 204 on which the polishing pad 110 is placed. During a polishing operation, a polishing liquid 206, e.g., an abrasive slurry, is dispensed on the surface of the polishing pad 110 by a polishing liquid supply port, which can be combined with a rinse arm 208. The polishing liquid 206, in some cases, contains abrasive particles, a pH adjuster, or chemically active components.

In some implementations, to polish a substrate 210, the substrate 210 is held against the polishing pad 110 by a carrier head 212. The carrier head 212 is suspended from a support structure, such as a carousel, and is connected by a carrier drive shaft 214 to a carrier head rotation motor so that the carrier head can rotate about an axis 216. The relative motion of the polishing pad 110 and the substrate 210 in the presence of the polishing liquid 206 results in polishing of the substrate 210.

In another example of an additive manufacturing apparatus 100, the apparatus 100 includes multiple printheads that dispense multiple feed materials to form an article, e.g., a polishing pad 110, having multiple layers of varying material characteristics. The apparatus 100 includes, for example, three printheads 104a, 104b, 104c that dispense three feed materials, each of which has distinct material properties. This permits different layers of the article to be formed from different selections of the three feed materials. In some implementations, at least one of the layers of the article is formed from a combination of two of the three feed materials. Moreover, this permits a succession of layers to be deposited that exhibit a gradient in percentage contribution (by weight or volume) of one of the feed materials. This can provide transitional layers between the first and second layers which have different material ratios.

For example, the controller 116 can operate the printheads 104a, 104b, 104c to dispense a first layer of feed material on the platform 102. The first layer of feed material, when cured, forms for example the backing layer 158 of the polishing pad 110. The controller 116 also operate the printheads 104a, 104b, 104c to dispense a second layer of feed material above the first layer of feed material on the platform 102. The second layer of feed material, when cured, forms the polishing layer 156 of the polishing pad 110. In some examples, the second layer of feed material has material properties distinct from the material properties of the first layer of feed material. The second layer of feed material is formed from a selection of the three feed materials distinct from the selection of the three feed materials forming the first layer of feed material.

In some implementations, the polishing layer 156 is formed from the first feed material, and the backing layer 158 is formed from a combination of the second and third feed materials. The controller 116 operates the printheads 104a, 104b, 104c to dispense the first feed material, the second feed material, and the third feed material, respectively. In this regard, the controller operates the printhead 104a to dispense the first feed material to form the first layer of feed material, and operates the printheads 104b, 104c to dispense the second and third feed materials to form the second layer of feed material.

In some implementations, as described herein, the apparatus 100 includes the support 122 to support the printheads 104a, 104b, 104c above the platform 102 and the support 122 is movable horizontally to move the printheads 104a, 104b, 104c across the platform 102 in the scanning direction 126. Referring to FIGS. 7A and 7B, the printheads 104, for example, form sets of printheads 162a, 162b extending along the direction perpendicular to the scanning direction 126. As shown in FIG. 7A, the set of printheads 162a and the set of printheads 162b both extend along the direction perpendicular to the scanning direction 126 such that each printhead 104 of the set of printheads 162a is adjacent to and aligned with a corresponding printhead 104 of the set of printheads 162b. In some cases, the controller 116 operates the printheads 104 such that the set of printheads 162b dispenses feed material, advances the support 122 an increment in the scanning direction 126, and then dispenses feed material using the set of printheads 162a. The feed materials dispensed by the set of printheads 162a and by the set of printheads 162b are substantially collocated on the platform 102. In this regard, the feed material dispensed by the set of printheads 162a and the feed material dispensed by the set of printheads 162b are combined at a set of voxels such that the voxels have material properties derived from both of the feed materials. In some cases, the sets of printheads 162a, 162b dispense the same type of feed material to increase throughput.

In some implementations, as shown in FIG. 7B, the printheads 104 of the set of printheads 162a are adjacent to and staggered relative to the printheads 104 of the set of printheads 162b. In some cases, the controller 116 operates the set of printheads 162a to dispense a set of voxels, advances the gantry 122 an increment in the scanning direction 126, and then dispenses another set of voxels. The voxels dispensed by the set of printheads 162a and the voxels dispensed by the set of printheads 162b are adjacent to one another. The set of printheads 162a dispenses a first feed material, and the set of printheads 162b dispenses a second feed material. In some cases, the adjacent voxels coalesce such that the feed materials disperse into adjacent voxels such that voxels have material properties similar to the material properties of the two feed materials if they were mixed, e.g., dispensed on the same voxel.

In some implementations, referring back to FIG. 4, the printhead 104a is operated to dispense the first layer of a first feed material to form the backing layer 158 of the polishing pad 110, and the printheads 104b, 104c are operated to dispense the second layer of a combination of a second feed material and a third feed material to form the polishing layer 156 of the polishing pad 110. The printheads 104b, 104c are, for example, adjacent to and offset from one another, and the printheads 104b, 104c dispense voxels of the second feed material and voxels of the third feed material, respectively, to form the second layer of feed material. The controller 116, for instance, operates the printheads 104b, 104c to simultaneously dispense the second and third feed materials to locations above the platform to form the second layer.

In some implementations in which the polishing pad 110 to be formed includes the grooves 160, the controller 116 selectively operates the printheads 104a, 104b, 104c such that the dispensed second layer of feed material includes discontinuous portions. The discontinuous portions, when cured, form the grooves 160 of the polishing pad 110.

In some implementations, the first layer of feed material includes two different types of feed material, and the second layer of feed material includes a single type of feed material. The printheads 104a, 104b, for example, are operated to dispense the first layer of feed material, and the printhead 104c is operated to dispense the second layer of feed material. Alternatively, in some cases, both the first layer and the second layer include two different type of feed material. For example, the first layer and the second layer can include the same type of feed material, e.g., feed material A. The first layer can additionally include a feed material that the second layer does not include, e.g., feed material B, and the second layer can additionally include a feed material the first layer does not include, e.g., feed material C.

In another example of the additive manufacturing apparatus 100, referring back to FIG. 4, the apparatus 100 includes a feed material delivery system 164 that delivers different feed materials, e.g., feed materials A, B, and C to the printheads 104a, 104b, 104c. The feed material delivery system 164 includes at least three feed material sources, e.g., feed material sources 166a, 166b, 166c. The feed material sources 166a, 166b, and 166c contain feed materials A, B, and C, respectively. In some implementations, the feed material sources 166a, 166b, and 166c are reservoirs of feed materials A, B, and C, respectively. The feed material sources 166a, 166b, 166c are each connected to each of the printheads 104a, 104b, 104c and, when selectively operated, deliver their respective feed materials A, B, C to one or more selected printheads.

The apparatus 100 further includes a flushing system 168 connected to the printheads 104a, 104b, 104c. The flushing system 168 delivers flushing fluid to the printheads 104a, 104b, 104c, for example, to flush residue feed material from the printheads 104a, 104b, 104c.

During a manufacturing operation to form the polishing pad 110, the controller 116 can operate the feed material delivery system 164 and the printhead 104a to dispense the feed material A onto the platform 102. After the dispensing operation to dispense the feed material A is complete, the controller 116 can then operates the flushing system 168 to flush the printhead 104a such that residue feed material A is flushed from the printhead 104a. The controller 116 can then operates the feed material delivery system 164 and the printhead 104a to dispense a different feed material, e.g., the feed material B onto the platform.

In some implementations, the apparatus 100 includes sensors to detect levels of feed materials A, B, and C in the feed material sources 166a, 166b, 166c. The sensors include, for example, a float sensor in the feed material sources 166a, 166b, 166c. Alternatively or additionally, the sensors include a weight sensor under the feed material sources. The controller 116, based on signals from the sensors, determines a level of feed material can be used remaining within the feed material sources 166a, 166b, 166c. In some cases, the controller 116 activates an alert to inform a user that a feed material source 166a, 166b, 166c needs to be replaced or refilled because the level of feed material is below a threshold level. Moreover, other sensors such as transmission type sensors, electrical conductivity sensors can be used to monitor the amount of ink used or remaining.

In some implementations, the flushing system includes a flushing fluid source. In some cases, the flushing fluid source is replaceable. In some cases, the flushing fluid includes a colored ink, e.g., a red ink. An optical color detector, e.g., the optical sensor 136, in some cases, monitors the flushing fluid to determine when the color of the fluid ejected from the printhead 104a substantially matches the color of the colored ink. The color of the ejected fluid matching the color of the colored ink indicates that the flushing operation has successfully flushed the printhead 104a of the residual feed material used in a previous dispensing operation. In some cases, upon detecting that the color of ejected fluid matches the color of the colored ink, the controller 116 operates the flushing system to eject another flushing fluid from another flushing fluid source. The other flushing fluid is, for example, a clear fluid. In this regard, the distinct colors of the flushing fluids provide a visual indication of when the residual feed material is being flushed, e.g., the fluid is red, and when the residual feed material has been sufficiently flushed out, e.g., the fluid is clear.

The controller, e.g., the controller 116, can be implemented in digital electronic circuitry, or in computer software, firmware, or hardware, or in combinations of them. The controller can include one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The controller 116 and other computing devices part of systems described can include non-transitory computer readable medium to store a data object, e.g., a computer aided design (CAD)-compatible file that identifies the pattern in which the feed material should be formed for each layer. For example, the data object could be a STL-formatted file, a 3D Manufacturing Format (3MF) file, or an Additive Manufacturing File Format (AMF) file. In some implementations, e.g., where there are a limited number of layers, the data object could include one or more image files, e.g., TIFF, jpeg, etc., files. The controller could receive the data object from a remote computer. A processor in the controller 116, e.g., as controlled by firmware or software, can interpret the data object received from the computer to generate the set of signals necessary to control the components of the apparatus 100 to deposit and/or cure each layer in the desired pattern.

A number of implementations have been described. Nevertheless, it will be understood that various modifications may be made.

Thickness of each layer of the layers of feed material and size of each of the voxels may vary from implementation to implementation. In some implementations, when dispensed on the platform 102, each voxel can have a width of, for example, 10 µm to 200 µm, e.g., 10 µm to 50 µm (e.g., 10 µm to 30 µm, 20 µm to 40 µm, 30 µm to 50 µm, approximately 20 µm, approximately 30 µm, or approximately 50 µm). Each layer can have a predetermined thickness. The thickness can be, for example, 1 µm to 5 µm, 5 µm to 10 µm, 1 µm to 10 µm, 10 µm to 125 µm (e.g., 10 µm to 20 µm, 10 µm to 40 µm, 40 µm to 80 µm, 80 µm to 125 µm, approximately 15 µm, approximately 25 µm, approximately 60 µm, or approximately 100 µm).

While examples of the additive manufacturing apparatus 100 including 1, 2, or 3 printheads have been described, in some implementations, the apparatus 100 includes four or more printheads. Each of the printheads is, for example, mounted onto the gantry 122. The printheads are thus movable as a unit across the platform 102. In some cases, the apparatus 100 includes 8 or more printheads, e.g., 8 printheads, 12 printheads, etc. that are aligned along the scanning direction 126. In one example, 4 of the printheads dispense a first feed material, e.g., feed material A, 2 of the printheads dispense a second feed material, e.g., feed material B, and 2 of the printheads dispense a third feed material, e.g., feed material C.

While the sensing system 112 has been described as having the optical sensor 132 to monitor the dispensing operation of the printhead 104a, in some implementations, the optical sensor 132 monitors the dispensing operation of each of the printheads, if multiple printheads are present. In some implementations, the sensing system 112 includes an optical sensor to monitor the dispensing operation of each of the printheads. The sensing system 112 includes, for example, for each of the printheads, an optical sensor positioned to detect drop dynamics of drops dispensed for it corresponding printhead. Alternatively or additionally, the sensing system include, for each of the printheads, an optical sensor positioned to detect features of the layers of feed material at locations directly below the corresponding printhead.

Although the examples of the manufacturing apparatus 100 include a single support for the printhead, the apparatus 100 could include multiple independently moveable supports, e.g., multiple independently movable gantries, each of which holds an independently operating printhead. These multiple supports can be spaced apart along the direction of motion, e.g., along Y-axis. Alternatively, these multiple supports can be spaced apart along the width of the platform, e.g., along X-axis. In addition, the system could include separate independently movable supports for the printhead and the energy source. An advantage of having the printhead and energy source on the same support is consistent coordination of motion, which can simplify the control algorithm and improve uniformity of quality of fusing.

Although the apparatus has been described in the context of fabrication of a polishing pad, the apparatus can be adapted for fabrication of other articles by additive manufacturing.

Accordingly, other implementations are within the scope of the claims.

What is claimed is:
1. An additive manufacturing apparatus comprising:
three printing stations arranged in a line along a first axis, each printing station including
a platform having a width along a second axis perpendicular to the first axis, and
an actuator system coupled to the platform to adjust a tilt of the platform, the actuator system comprising three independently operable vertical actuators positioned at a perimeter of the platform and coupled to the platform at three different locations at three different angular positions around a center of the platform;
a support positioned above the three printing stations, the support movable along the first axis;

one or more printheads mounted on the support, the one or more printheads configured to dispense successive layers of feed material on each platform of the three printing stations, the one or more printheads spanning the width of each platform along the second axis;

an actuator coupled to the support to cause the support to move along the first axis;

a sensing system to detect a height of a top surface of the successive layers of feed material on each platform at each of a plurality of horizontally spaced points; and a controller including one or more processors and non-transitory computer-readable media having encoded instructions to cause the one or more processors to cause the actuator to move the support along the first axis such that the one or more print heads scan across each platform of the three printing stations, cause the one or more printheads to eject material to form a polishing pad on each platform of the three printing stations, including instructions to cause the one or more printheads to form each of a plurality of layers from the successive layers with a substantially homogenous composition and with a flat top surface that extends across the plurality of horizontally spaced points, and at each platform of the three printing stations, for each of the plurality of the successive layers, selectively operate the actuator system to adjust the tilt of the platform based on the detected height of the top surface at each of the points such that the top surface is moved closer to horizontal.

2. The apparatus of claim 1, wherein the non-transitory computer-readable media has encoded instructions to cause the one or more processors to selectively operate the actuator to vertically move the support based on the detected height of the top surface at each of the points.

3. The apparatus of claim 1, wherein the sensing system is mounted on the support.

4. The apparatus of claim 1, wherein the sensing system comprises a non-contact sensor to detect the height of the top surface at each of the points.

5. The apparatus of claim 4, wherein the sensing system comprises an optical sensor to detect the height of the layers of feed material at each of the points.

6. The apparatus of claim 1, wherein the non-transitory computer-readable media has encoded instructions to cause the one or more processors to determine a height skew based on the height of the surface at each of the points, and selectively operate the actuator system to pivot the platform so as to reduce the height skew.

7. The apparatus of claim 6, wherein the non-transitory computer-readable media has encoded instructions to cause the one or more processors operate the three independently operable vertical actuators to lower each platform after each of the layers of feed material is deposited at the platform so as to maintain a constant height offset between the one or more printheads and an exposed layer of the layers of the feed material from layer-to-layer.

8. The additive manufacturing apparatus of claim 1, wherein at least two of the locations are positioned within 10 cm of where a perimeter of the polishing pad is to be formed.

9. The additive manufacturing apparatus of claim 8, wherein the at least two of the locations are positioned at equal angular intervals around a vertical axis through a center of where the polishing pad is to be formed.

10. The additive manufacturing apparatus of claim 9, wherein the locations positioned at equal angular intervals around the vertical axis comprise four points.

11. The additive manufacturing apparatus of claim 9, wherein at least one of the locations is positioned along a vertical axis through a center of where the circular pad is to be formed.

12. The additive manufacturing apparatus of claim 1, wherein at each printing station the platform is pivotally coupled to the each of the three independently operable vertical actuators.

13. The apparatus of claim 1, wherein the non-transitory computer-readable media has encoded instructions to cause the one or more processors to adjust a dispensing operation of a second printhead in response to detecting an error condition associated with a first printhead while operating the printheads to successively dispense the layers of feed material.

14. The apparatus of claim 1, wherein each respective actuator is coupled to the platform at a respective location at the perimeter of the platform that is directly vertically above the respective actuator to vertically adjust the respective location.

* * * * *